United States Patent [19]
Forkey et al.

[11] Patent Number: 5,124,838
[45] Date of Patent: Jun. 23, 1992

[54] OPTICAL COUPLER

[75] Inventors: Richard E. Forkey, Westminster; Arthur H. Shoemaker, Hubbordston, both of Mass.

[73] Assignee: Precision Optics Corporation, Westminster, Mass.

[21] Appl. No.: 304,568

[22] Filed: Jan. 31, 1989

[51] Int. Cl.⁵ .................. G02B 23/00; G02B.7/02
[52] U.S. Cl. .................. 359/435; 359/367; 359/821
[58] Field of Search ........... 350/255, 589, 254, 423, 350/429, 584, 242, 243, 257, 412-419, 570-573, 465-482, 589-590, 245-252; 128/4, 6.4, 303.1, 6; 356/124, 244; 359/434-435, 362-367, 642-651

[56] References Cited

U.S. PATENT DOCUMENTS

| | | | |
|---|---|---|---|
| 3,399,015 | 8/1968 | Jacobs | 350/429 |
| 3,740,114 | 6/1973 | Thompson | 350/589 |
| 3,817,601 | 6/1974 | Colaiace et al. | 350/255 |
| 4,036,218 | 7/1977 | Yamashita et al. | 350/252 |
| 4,148,550 | 4/1979 | MacAnally | 350/242 |
| 4,148,551 | 4/1979 | MacAnally | 350/242 |
| 4,290,669 | 9/1981 | Belva et al. | 350/174 |
| 4,354,730 | 10/1982 | Bel | 359/434 |
| 4,367,010 | 1/1983 | Broome | 350/563 |
| 4,402,572 | 9/1983 | Tsunoda et al. | 350/589 |
| 4,436,375 | 3/1984 | Meginnis | 350/319 |
| 4,568,155 | 2/1986 | Shimizu | 350/522 |
| 4,575,195 | 3/1986 | Hoogland | 350/480 |
| 4,704,001 | 11/1987 | Parandes | 350/242 |
| 4,718,750 | 1/1988 | Forkey | 350/589 |
| 4,740,058 | 4/1988 | Hori et al. | 350/255 |
| 4,770,520 | 9/1988 | Hoogesteger | 350/589 |
| 4,781,448 | 11/1988 | Chatenever et al. | 350/429 |
| 4,783,154 | 11/1988 | Takahashi | 350/413 |
| 4,784,118 | 11/1988 | Fantone et al. | 359/434 |
| 4,938,573 | 7/1990 | Saito | 350/432 |
| 4,946,267 | 8/1990 | Hoogland | 359/435 |
| 4,993,817 | 2/1991 | Hoogland | 359/435 |

OTHER PUBLICATIONS

Precision Optics; Spindler & Hoyer of Göttingen; Germany 1988, pp. A1, A11, A15,; A17–A18, A47–A48; D13–D17; U8.

Optics Guide 3; Melles Griot of Zerenaar, Netherlands 1985; pp. 3–28; 62–63, 68 and 126–148.

Primary Examiner—Bruce Y. Arnold
Assistant Examiner—Thong Nguyen
Attorney, Agent, or Firm—Pearson & Pearson

[57] ABSTRACT

An optical device that can be sterilized by autoclaving or immersion. The optical device includes adjoined elements that essentially eliminate any air internal spaces along the optical path. A carrier for the optical elements and other elements of the optical device comprise metals and metal alloys that withstand the sterilizing environment. Vacuum port elements are provided to enable any liquids to be evacuated from the interstices of the optical device.

34 Claims, 2 Drawing Sheets

OPTICAL COUPLER

BACKGROUND OF THE INVENTION

1. Field of the Invention

This invention generally relates to optical devices and more specifically to optical devices that are used in clean environments.

2. Description of Related Art

Reference is made to the following Letters Patent of the United States:
U.S. Pat. No. 4,402,572 (1983) Tsunoda et al
U.S. Pat. No. 4,718,750 (1988) Forkey In the Forkey patent, an optical coupler includes a lens in a cylindrical carrier, a body assembly and a sleeve that can slide within the body assembly. This coupler is designed to connect to a photographic or image recording device at one end and to an optical instrument at the other end. The lens and carrier can move axially within the body portion to focus an image from the optical instrument onto an imaging plane in the recording device.

These and other optical devices are quite useful during medical procedures involving optical diagnostic instruments such as endoscopes and the like. However, in such environments, it is imperative that the devices be clean. In fact, it is highly desirable that such optical devices be capable of undergoing sterilization procedures in conventional autoclaves or in liquid immersion or gaseous sterilizing facilities.

Autoclaving normally occurs in steam in the region of 270° F. at pressures in the range of 30 psi. In immersion procedures, equipment is immersed in various sterilizing solutions or in ethylene trioxide and similar gaseous sterilizing agents. Each of these procedures can represent a very harsh environment for optical devices. In prior optical systems it has been necessary to seal the device against liquids. For example, in the Forkey patent fine threads and lubricants effect a seal to block fluids from entering the system. In other optical systems the lens are sealed from external liquids and are filled with a dry inert gas. However, even with these approaches, repeated sterilization processes eventually break down the seals and allow liquid to enter into the lens system. When this occurs, condensation can occur in the optical path and residual sterilizing solutions can remain in the optical path; both will distort the image.

The Forkey patent is also representative of lens systems that utilize relatively thin lenses in the optical path. The Tsunoda et al patent discloses a projection device that utilizes elongate bar lens of plastic, each with a great length along the direction of its optical axis. Plastic lens, however, are affected by moisture that can alter the refractive indices differently across the lens. Thus, the Tsunda et al patent describes a structure wherein the bar lenses are positioned in a lens holding member that is sealed at both the incidence and emergence ends by transparent and moisture-impervious members. With the lens holding member, two spaced plastic bar lenses are located along an optical axis, but are separated axially by a ring structure. This total structure is then stated to shield the plastics lenses from the outside environment.

The structure in the Tsunoda et al patent is primarily designed for use in photocopy machines and the like, not in a hostile environment such as found in an autoclave or during immersion in a sterilizing solution. The structure in the Forkey patent, while sealing the optical path from the external environment is complex to make and can only withstand a limited number of sterilizing procedures.

SUMMARY

Therefore, it is an object of this invention to provide an optical system that is designed to undergo repeated sterilizing procedures.

Another object of this invention is to provide an optical system that is particularly designed to undergo repeated sterilizing procedures in an autoclave.

Still another object of this invention is to provide an optical system that is readily adapted to a wide variety of applications.

In accordance with this invention, a lens system comprises adjoining lens elements extending along an optical axis formed of any of various lens materials that are impervious to the various elements encountered in sterilizing or other similar environments. The lens system extends axially for a distance that is greater than a transverse dimension of the lens system. An opened-ended lens carrier supports the lens system, and the lens system essentially completely fills the carrier. The lens carrier and various structures that support it comprise any of various materials that withstand the conditions encountered in sterilizing or similar environments. Means are provided to remove any residual liquids that might accumulate between the lens carrier and its supporting structures.

BRIEF DESCRIPTION OF THE DRAWINGS

This invention is pointed out with particularity in the appended claims. The various objects, advantages and novel features of this invention will be more fully apparent from a reading of the following detailed description taken read in conjunction with the accompanying drawings in which like reference numerals refer to like parts, and in which:

DESCRIPTION OF ILLUSTRATIVE EMBODIMENTS

Figure 1:
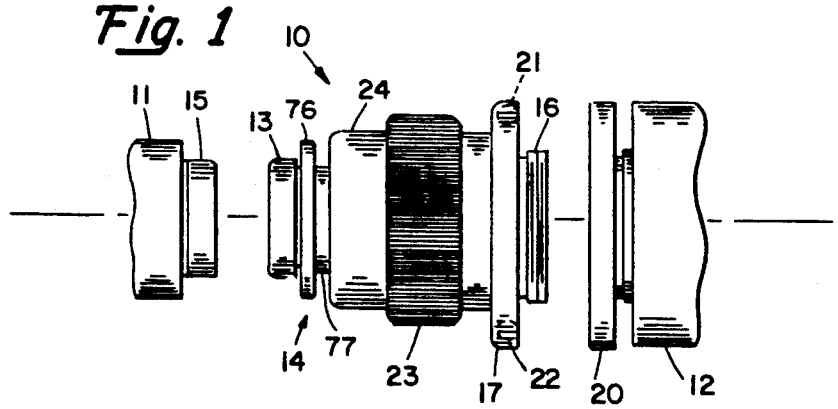
FIG. 1 is a view of an assembled optical device constructed in accordance with this invention.

Referring to FIG. 1, this invention is described in terms of one specific embodiment of an optical coupler 10 that interconnects first and second image means, such as an image generating device 11 and an image recording device 12 respectively. As will become apparent, the specific natures of the image generating device 11 and image recording device 12 are not important for an understanding of this invention; they can individually comprise a wide variety of optical instruments.

Figure 2:
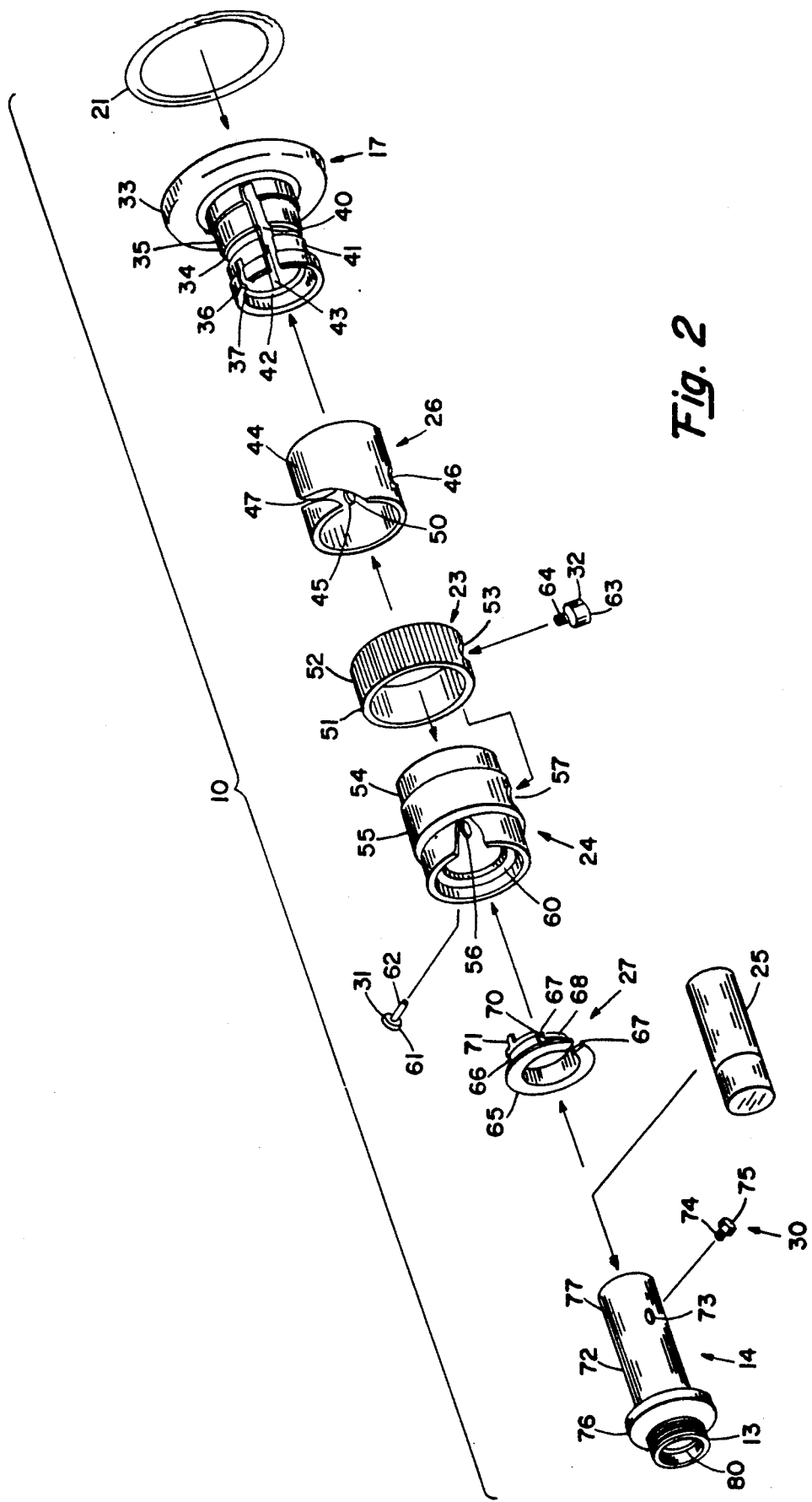
FIG. 2 is a perspective exploded view of the optical system shown in FIG. 1.

Referring now to FIGS. 1 and 2, the optical coupler 10 includes a threaded male coupling 13 on a lens carrier 14 that engages a female threaded coupling member 15 on the image generating device 11. This provides a light-tight connection and appropriate alignment between the optical coupler 10 and the image generating device 11. Likewise, the optical coupler 10 includes a threaded male portion 16 on a camera barrel or base portion 17 that is engaged by a female threaded coupling 20. Normally the coupling 20 will include a flange for engaging an O-ring 21 in a circumferential channel 22 cut in a counterfacing surface of the base portion 17 thereby to seal the optical coupler 10 and the image recording device 12. Moreover this connection provides a light-tight properly aligned relationship between the optical coupler 10 and image recording device 12.

Still referring to FIGS. 1 and 2, the focus of this particular optical coupler is provided by turning a knurled focusing sleeve 23 that is affixed to a focusing knob 24. This cause the lens carrier 14 to move a lens 25 in the carrier axially thereby to focus an image from the image generating device 11 onto a focal plane of the image recording device 12. As shown more specifically in FIG. 2, the components of the focusing mechanism include, in addition to the focus sleeve 23 and focus knob 24, a helix sleeve 26, a stop ring 27, a focusing pin 30 and a locating pin 31. A vacuum port 32 is also provided.

Now referring specifically to FIG. 2, each of the foregoing components will be described in detail. The camera barrel 17 is formed about an annular base flange 33 that carries the threaded male fitting 16 and O-ring channel 22 shown in FIG. 1. A cylindrical barrel 34 extends from the annular base plate 33 and is coaxial with an optical axis. The inner diameter of the barrel 34 accepts the lens carrier 14 in a sliding relationship. Circumferential, spaced lands 35 and 36 are positioned at the ends of the cylindrical barrel 34 and provide smooth and polished surfaces upon which the helix sleeve 26 rotates. A tab slot 37 is positioned to receive a protruding tab on the stop ring 27 as described later. Similarly, the cylindrical barrel 34 has an axially extending slot 40 substantially through the length thereof and opened at one end thereof. A circumferential slot 41 diametrically opposed from the axial slot 40 lies between the lands 35 and 36. An inner groove 42 of the barrel coacts with the stop ring 37 as described later. In addition a number of spaced axially extending grooves 43 are formed in the inner surface of the barrel to facilitate evacuation of the unit.

As previously indicated, the helix sleeve 26 rides on the lands 35 and 36. More particularly, the helix sleeve 26 includes a cylindrical sleeve 44 with a smooth inner surface. An aperture 45 formed in the cylindrical sleeve 44 receives the locating pin 31. A threaded aperture 46 angularly displaced from the aperture 45 (by 90°) receives the vacuum port 32. A helix 47 is cut into the helix sleeve 26 and is open at one end 50 and closed at the other end. The helix 47 receives the focus pin 30. In a typical construction, the threaded aperture 46 is located diametrically across from the center of the helix 47.

The focus sleeve 23 comprises a ring 51 with a knurled outer surface 52 and an aperture 53 for the vacuum port 32. The focus knob 24 comprises a cylinder 54 with a centrally located raised land 55. The land 55 accepts the ring 51 in a tight fit so that rotation of the focus sleeve 23 produces rotation of the focus knob 24. In addition the focus knob 24 includes an aperture 56 that receives the locating pin 31 and a ridge 60 that interacts with the stop ring 27.

The locating pin 31 contains an enlarged head portion that rests in a counterbore (not shown) formed on the outer surface of the land 55. A pin 62 extends from head 61 radially inward through the aperture 56, the aperture 45 in the helix sleeve 26 and the circumferential slot 41 in the camera barrel 17. The focus sleeve 23 captures the locating pin 31 in position.

The vacuum port 32 includes a vented head 63 and vented threaded portion 64 that pass through the aperture 53 in the focus sleeve 23 and the aperture 57 in the focus knob 24 to be secured in the threaded aperture 46 of the helix sleeve 26. The vacuum port 32 therefore provides a means for pumping out any internal cavity (as for example, defined by the lands 35 and 36 and the helix sleeve 26). It also prevents any relative rotation of the sleeve 23, the focus knob 24 and the helix sleeve 26.

The helix sleeve 26 and the focus knob 24 are all held in position on the cylindrical barrel 34 by the stop ring 27. The stop ring 27 includes an annular, radially extending flange 65 and an axially extending cylindrical portion 66. A zee-shaped channel 67 is cut through the stop ring 27 in a generally axial direction. A land 68 is formed at the end of the cylindrical portion 66. A detent bump 70 is formed in the circumferentially extending portion of the zee-channel 67. A tab 71 extends axially from the cylindrical portion 66 and is located adjacent to land 68.

The lens carrier 14 includes a cylindrical barrel portion 72 that contains a tapped aperture 73 for receiving a threaded portion 74 of the focusing pin 30. The barrel portion 72 is open at both ends. The focusing pin 30 has an enlarged head portion 75 that corresponds to the width of the zee channel 67 through the stop ring 27, the helix 47 in the helix sleeve 26 and the axial slot 40 in the cylindrical barrel 34. A flange 76 is located adjacent the threaded portion 13 and the interior portion of the cylinder 72 terminates in a ridge 80 that axially positions the lens 25.

During assembly of the parts shown in FIG. 2 into the assembly shown in FIG. 1, the helix sleeve 26 slides onto the camera barrel 17 to overlie the lands 35 and 36. The open end 50 of the helix 47 is aligned with the axial slot 40 and the aperture 45 is aligned axially with the circumferential slot 41. The focus knob 24 is then slid over the helix sleeve 26 with the apertures 56 and 57 being aligned respectively with the apertures 45 and 46 of the helix sleeve 26. The locating pin 31 is then inserted so that the head 61 nests in the counterbore on the outer surface of the central land 55. The pin 62 then extends through the aperture 56 of the focus knob 24 and the open end 50 of the helix sleeve 26 into the circumferential slot 41. When the focus sleeve 23 is then positioned over the land 55, the helical sleeve 26 captures the locating pin 31 in position and the locating pin 31 thereby prevents any axial motion of the focus sleeve 23, focus knob 24, and helix sleeve 26 with respect to the camera barrel 17. When the focus sleeve 23 is positioned on the land 55, it is located with its aperture 53 in alignment with the aperture 57, so the vacuum port 32 can then be inserted through the apertures 53 and 57 and threaded into the threaded aperture 46 of the helix sleeve 26.

Next the stop ring 27 is moved axially into the end of the focus knob 24 with the tab 71 aligned with the slot 37 in the camera barrel 17. As the zee-slot 67 passes through the stop ring 27, the stop ring 27 can compress slightly. When the stop ring 27 is fully inserted, the land 68 snaps into the groove 42 in the cylindrical barrel while the flange 65 rests against the ridge 60 in the focus knob 24.

A lens carrier 14 can then be inserted independently of any other assembly operations and, as described later, can be interchanged to permit a single optical coupler 10 to utilize lens configurations of different focal lengths. More specifically, a lens carrier 14 with its lens 25 is inserted by aligning the focus pin 30 with the opening of the zee-shaped channel 67 in the flange 65 of the stop ring 27. The lens carrier 14 then is moved axially and turned (counterclockwise in FIG. 2 when viewed from the threaded end 13.) The head 75 of the focus pin 30 will engage the detent 70, but the stop ring will deflect sufficiently to allow the head 75 to pass the detent. Then the lens carrier 14 can be moved axially into the aligned opening 50 of the helix 47 and the end of the axial slot 40 in the camera barrel 17.

Thereafter the rotation of the focus sleeve 23 will produce rotation of the helix channel and cause the intersection of the helix 47 and the axial slot 41 to move axially thereby moving the entire lens carrier 14 axially toward or away from the camera barrel 17 and, as shown in FIG. 1 the image recording device 12. During use the detent 70 in the stop ring 27 prevents the person using the optical coupler 10 from inadvertently turning the focus sleeve 23 so far as to allow the lens carrier 14 to be pushed to decouple from the axial slot 40 and the helical sleeve 26.

Figure 3:
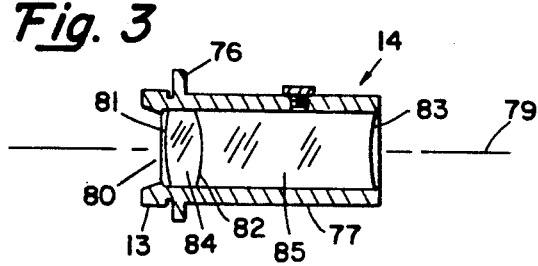
FIGS. 3 through 7 illustrate various lens systems that can be incorporated in a lens carrier such as shown in FIGS. 1 and 2.
Figure 4:
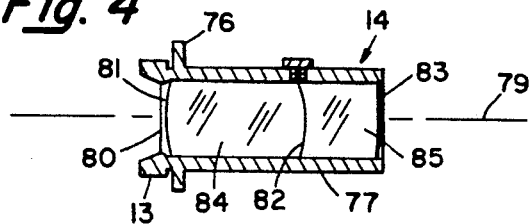
Figure 5:
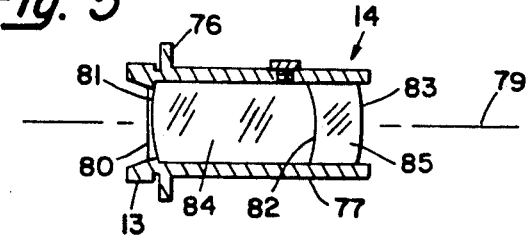
Figure 6:
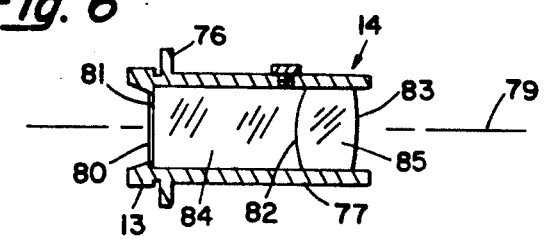
Figure 7:
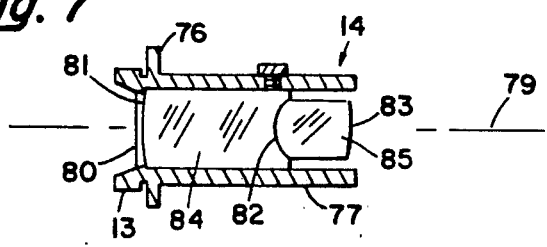

There are two features that contribute to the ability of the optical coupler 10 to withstand the hostile environment of autoclave or immersion sterilization techniques. The first relates to the lens structure. As shown in FIGS. 2 and more specifically in FIGS. 3 through 7, this coupler includes a doublet lens with lenses 84 and 85. Unlike doublet lens used in prior devices, at least one of the two lenses in the doublet has a length along an optical axis 79 that is long in comparison with the diameter or transverse dimension of the lens. Moreover, there are no air gaps in the optical path between a first end surface 81 on a lens assembly and the other end surface 83, and the cylinder 77 of the lens carrier 14, as shown in cross-sections in FIGS. 3 through 7, surrounds the lenses in each doublet. The only area of a lens that sterilizing liquids or steam can attack is at the end surfaces 81 and 83. The remaining surface including interface surface 82 between the adjoined lenses is protected. More specifically as shown in FIGS. 3 through 7, the interfacing surfaces 82 are counterfacing surfaces with radii of curvature that enable the surfaces to be fitted together to eliminate air space between the surfaces 82. While the lens carrier 14 defines a particular volume between the ridge 80 and the other end, the doublet lens essentially fills that entire volume to eliminate any air spaces. By eliminating air spaces, the possibility of condensation in an internal portion of the optical path, that is not readily accessible, is minimized and eliminates the need for dry packing with nitrogen or other inert gas. Moreover, filling the lens carrier volume positions the end surfaces in substantially the same planes as the respective ends of the lens carrier. Stated differently, the overall length of the doublet lens in each of FIGS. 3 and 7 is substantially coextensive with the length of the lens carrier. A number of optical glass materials can be utilized in forming the doublet lenses shown in FIGS. 3 through 7.

The other feature that contributes to the ability of the optical coupler to withstand the hostile environment of sterilizing processes is the selection of the materials utilized for the various components of the coupler shown in FIGS. 1 and 2. Materials selected for the optical coupler must be stable. They must have the right coefficients of thermal expansion, resist corrosion at high temperatures and humidity, provide good bearing surfaces and be electrochemically stable under sterilizing conditions. A number of metals, such as titanium, and alloys, such as stainless steel, meet these requirements and can be utilized for all the parts of the optical coupler. In some embodiments, however, it may desirable to have the helical sleeve 26 formed of a metal that has the foregoing attributes but is slightly softer than the other metals or alloys. It has been found that a Monel alloy provides a satisfactory material for the helix sleeve 26.

During autoclaving procedures, the entire coupler 10 shown in FIGS. 1 and 2 is placed into an autoclave and subjected to steam under pressure. There are essentially no air spaces within the system, so essentially no liquid can condense in the optical path. Moreover, the temperatures and retained heat in the metallic components tend to flash off any moisture that might otherwise have accumulated in the interstices of the coupler 10. If the couple 10 was sterilized by immersion in a gas or liquid and some fluid were to remain within the coupler a vacuum, that is relatively easily drawn through a vacuum line to the vacuum port 32 shown in FIG. 2, will withdraw any residual fluid through the grooves 43 and other spaces and through the area between the lands 35 and 36.

Another advantage of this design lies in its capability to interchange lens assemblies of different focal lengths. Lens materials should be selected with respect to the Abbé number and the index of refraction in order to control dispersion and chromatic aberration within the system. The refractive indices for Fraunhofer lines of the solar spectrum are a particularly appropriate fraction parameter. It also is desirable to have a back focal length that is long enough to provide a minimum of $\pm 2.7$ diopter focus range. Further, it is important to select the lens materials, lengths along the optical axis and radius of curvature so that the sum of the lengths of the lenses along the optical axes are constant.

With these considerations a lens manufacturer can construct doublet lens according to the FIGS. 3 through 7 that have predetermined, but different focal lengths. More particularly, FIGS. 3 through 7 indicate respectively doublet lens assemblies with focal lengths ranging from 45 mm to 20 mm respectively as apparent from FIGS. 3 through 7, all the lens carriers 14 have the same predetermined length.

The foregoing description as related to a specific embodiment of an optical coupler utilizing a variety of doublet lens assemblies with the capability of providing focusing. It will be obvious that the concept of filling the optical space and the use of particular metallic components constructed with relatively close tolerances for these environments can be applied to a number of optical devices. It also will be apparent that many other modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. An optical device adapted for conveying an image along an optical axis between first and second image means, said optical device comprising:
   A. open-ended lens carrier means having a given internal volume disposed along the optical axis for a predetermined axial length and having means for connection to the first image means, B. housing means for supporting said lens carrier means including means for connection to the second image means, C. a plurality of adjoined lens means mounted in said carrier means and aligned along the optical axis for transferring an image to the second image means, each of said lens means having end surfaces, counterfacing end surfaces of said adjoined lens means having radii of curvature that enable said counterfacing end surfaces to be fitted together to eliminate gaps between said counterfacing end surfaces, said plurality of adjoined lens means having an overall length that is substantially coextensive with the predetermined length of said lens carrier means and having a total volume that corresponds to and essentially fills the internal volume of said carrier means whereby air gaps are eliminated within the confines of said lens carrier means and said ends of said plurality of adjoined lens means are accessible through the open ends of said lens carrier means; and D. focusing means for moving said lens carrier means relative to said housing means along the optical axis thereby to focus an image on said second image means.

2. An optical device as recited in claim 1 wherein said housing means includes cylindrical barrel means having an axial slot therein, and said focusing means includes:

i. rotatable focus means for controlling focusing by rotation about the optical axis;

ii. sleeve means having a helical slot formed therein for rotating with said rotatable focus means about said barrel means; and iii. means on said lens carrier means for engaging said sleeve means at said helical slot and said barrel means at said axial slot whereby motion of said rotatable focus means and said sleeve means produces axial motion of said lens carrier means relative to said barrel means.

3. An optical device as recited in claim 2 additionally comprising vacuum port means, each of said rotatable focus means and said sleeve means including means for receiving said vacuum port means.

4. An optical device as recited in claim 2 wherein each of said rotatable focus means, said housing means and said lens carrier means are formed from a group of metals including stainless steels and titanium.

5. An optical device as recited in claim 1 wherein said adjoined lens means is constituted by a doublet lens having radii of curvature for providing a front focal length and a back focal length for said doublet lens that differ thereby to enable a focusing adjustment of +2.7 diopters.

6. An optical device as recited in claim 1 wherein said lens means includes lenses that are constructed from optical glass and wherein each of said housing means and said lens carrier means is constructed from a heat and oxidation resistant metal alloy.

7. An optical device as recited in claim 6 wherein one of said lens means has a length along said optical axis that is greater than its transverse dimension.

8. An optical device as recited in claim 6 wherein said housing means includes means for attaching a vacuum line thereby to evacuate said optical device.

9. An optical device for conveying an image along an optical axis between first and second image means, said optical device comprising:

A. open-ended carrier means having a given internal volume disposed along the optical axis with an axial length that is greater than a transverse dimension through the volume and having means for connection to the first image means, B. a plurality of adjoined lens means mounted in said carrier means and aligned along the optical axis for transferring an image to the second image means, each of said lens means having end surfaces, counterfacing end surfaces of said adjoined lens means having radii of curvature that enable said counterfacing end surfaces to be fitted together to eliminate gaps between said counterfacing end surfaces, said adjoined lens means having a total volume that corresponds to and essentially fills the internal volume of said carrier means, C. housing means for supporting said lens carrier means including means for connection to the second image means, D. vacuum port means connected to said housing means for enabling the evacuation of said optical device.

10. An optical device as recited in claim 9 wherein said lens means includes lenses that are constructed from optical glass and wherein each of said housing means and said lens carrier means is constructed from a heat and oxidation resistant metal alloy.

11. An optical device as recited in claim 9 wherein said optical device additionally comprises focusing means for moving said lens carrier means relative to said housing means along the optical axis thereby to focus an image on said second image means.

12. An optical device as recited in claim 11 wherein said lens means includes lenses that are constructed from optical glass and wherein each of said housing means, said focusing means and said lens carrier means is constructed from a heat and oxidation resistant metal alloy.

13. An optical device as recited in claim 11 wherein said housing means includes cylindrical barrel means having an axial slot therein, and said focusing means includes:

i. rotatable focus means for controlling focusing by rotation about the optical axis;

ii. sleeve means having a helical slot formed therein for rotating with said rotatable focus means about said barrel means; and iii. means on said lens carrier means for engaging said sleeve means at said helical slot and said barrel means at said axial slot whereby motion of said rotatable focus means and said sleeve means produces axial motion of said lens carrier means relative to said barrel means.

14. An optical device as recited in claim 13 wherein said lens means includes lenses that are constructed from optical glass and wherein each of said housing means, said focusing means and said lens carrier means is constructed from a heat and oxidation resistant metal alloy.

15. An optical device for conveying an image along an optical axis between first and second image means, said optical device comprising:

A. open-ended lens carrier means of a heat and oxidation resistant metal alloy having a given internal volume disposed along the optical axis with an axial length that is greater than a transverse dimension through the volume, B. a plurality of adjoined lens means of optical glass mounted in said carrier means and aligned along the optical axis for transferring an image from the first to the second image means, each of said lens means having end surfaces, counterfacing end surfaces of said adjoined lens means having radii of curvature that enable said counterfacing end surfaces to be fitted together to eliminate gaps between said counterfacing end surfaces, said lens means having a total volume that corresponds to and essentially fills the internal volume of said carrier means, C. housing means of a heat and oxidation resistant metal alloy for supporting said lens carrier means; and D. first and second connection means for connecting said optical device to the first and second image means thereby to support said housing means, said lens carrier means and said adjoined lens means on the optical axis.

16. An optical device as recited in claim 15 wherein said optical device additionally comprises focusing means of a heat and oxidation resistant alloy for moving said lens carrier means relative to said housing means along the optical axis thereby to focus an image on said second image means.

17. An optical device as recited in claim 16 wherein said housing means includes cylindrical barrel means having an axial slot therein, and said focusing means includes:
  i. rotatable focus means for controlling focusing by rotation about the optical axis;
  ii. sleeve means having a helical slot formed therein for rotating with said rotatable focus means about said barrel means; and
  iii. means on said lens carrier means for engaging said sleeve means at said helical slot and said barrel means at said axial slot whereby motion of said rotatable focus means and said sleeve means produces axial motion of said lens carrier means relative to said barrel means.

18. An optical device for conveying an image along an optical axis between first and second image means, said optical device comprising:
  A. open-ended lens carrier means having a given internal volume disposed along the optical axis with an axial length that is greater than a transverse dimension through the volume and having means for connection to the first image means,
  B. a doublet lens comprising first and second adjoined lenses mounted in said carrier means and aligned along the optical axis for transferring an image to the second image means, each of said lenses having end surfaces, counterfacing end surfaces of said lenses having radii of curvature that enable said counterfacing end surfaces to be fitted together to eliminate gaps between said lenses, each of said adjoined lenses having radii of curvature for providing a front focal length and a back focal length for said doublet lens that differ thereby to enable a focusing adjustment of ±2.7 diopters, said doublet lens having a total volume that corresponds to and essentially fills the internal volume of said carrier means, and
  C. housing means for supporting said lens carrier means including means for connection to the second image means.

19. An optical device as recited in claim 18 wherein each of said lenses is constructed from optical glass and wherein each of said housing means and said lens carrier means is constructed from a heat and oxidation resistant metal alloy.

20. An optical device as recited in claim 19 wherein said optical device additionally comprises focusing means for moving said lens carrier means relative to said housing means along the optical axis thereby to focus an image on said second image means.

21. An optical device as recited in claim 20 wherein said housing means includes cylindrical barrel means having an axial slot therein, and said focusing means includes:
  i. rotatable focus means for controlling focusing by rotation about the optical axis;
  ii. sleeve means having a helical slot formed therein for rotating with said rotatable focus means about said barrel means; and
  iii. means on said lens carrier means for engaging said sleeve means at said helical slot and said barrel means at said axial slot whereby motion of said rotatable focus means and said sleeve means produces axial motion of said lens carrier means relative to said barrel means.

22. An optical device as recited in claim 18 wherein said housing means includes means for attaching a vacuum line thereby to evacuate said optical device.

23. An optical device as recited in claim 22 wherein said lenses are constructed from optical glass and wherein each of said housing means and said lens carrier means is constructed from a heat and oxidation resistant metal alloy.

24. An optical device as recited in claim 22 wherein said optical device additionally comprises focusing means for moving said lens carrier means relative to said housing means along the optical axis thereby to focus an image on said second image means.

25. An optical device as recited in claim 24 wherein each of said housing means, said focusing means and said lens carrier means is constructed from a heat and oxidation resistant metal alloy taken from the group consisting of stainless steels and titanium.

26. An optical device as recited in claim 25 wherein said housing means includes cylindrical barrel means having an axial slot therein, and said focusing means includes:
  i. rotatable focus means for controlling focusing by rotation about the optical axis;
  ii. sleeve means having a helical slot formed therein for rotating with said rotatable focus means about said barrel means; and
  iii. means on said lens carrier means for engaging said sleeve means at said helical slot and said barrel means at said axial slot whereby motion of said rotatable focus means and said sleeve means produces axial motion of said lens carrier means relative to said barrel means.

27. An optical device as recited in claim 24 wherein said housing means includes cylindrical barrel means having an axial slot therein, and said focusing means includes:
  i. rotatable focus means for controlling focusing by rotation about the optical axis;
  ii. sleeve means having a helical slot formed therein for rotating with said rotatable focus means about said barrel means; and iii. means on said lens carrier means for engaging said sleeve means at said helical slot and said barrel means at said axial slot whereby motion of said rotatable focus means and said sleeve means produces axial motion of said lens carrier means relative to said barrel means.

28. An optical device as recited in claim 18 wherein said optical device additionally comprises focusing means for moving said lens carrier means relative to said housing means along the optical axis thereby to focus an image on said second image means.

29. An optical device as recited in claim 28 wherein said housing means includes cylindrical barrel means having an axial slot therein, and said focusing means includes:
   i. rotatable focus means for controlling focusing by rotation about the optical axis;
   ii. sleeve means having a helical slot formed therein for rotating with said rotatable focus means about said barrel means; and
   iii. means on said lens carrier means for engaging said sleeve means at said helical slot and said barrel means at said axial slot whereby motion of said rotatable focus means and said sleeve means produces axial motion of said lens carrier means relative to said barrel means.

30. An optical device as recited in claim 18 wherein one of said first and second lenses has a length along said optical axis that is greater than its transverse dimension.

31. An optical device as recited in claim 30 wherein said housing means includes means for attaching a vacuum line thereby to evacuate said optical device.

32. An optical device as recited in claim 30 wherein said doublet lens is constructed from optical glass and wherein each of said housing means and said lens carrier means is constructed from a heat and oxidation resistant metal alloy.

33. An optical device as recited in claim 30 wherein said optical device additionally comprises focusing means for moving said lens carrier means relative to said housing means along the optical axis thereby to focus an image on said second image means.

34. An optical device as recited in claim 33 wherein said housing means includes cylindrical barrel means having an axial slot therein, and said focusing means includes:
   i. rotatable focus means for controlling focusing by rotation about the optical axis;
   ii. sleeve means having a helical slot formed therein for rotating with said rotatable focus means about said barrel means; and
   iii. means on said lens carrier means for engaging said sleeve means at said helical slot and said barrel means at said axial slot whereby motion of said rotatable focus means and said sleeve means produces axial motion of said lens carrier means relative to said barrel means.

* * * * *